3,558,783
METHOD OF INHIBITING THE GROWTH OF BACTERIA AND FUNGI WITH ORGANOANTIMONY COMPOUNDS

John R. Leebrick, Old Lyme, Conn., and Nathaniel L. Remes, Livingston, N.J., assignors to M&T Chemicals Inc., New York, N.Y., a corporation of Delaware
No Drawing. Continuation of abandoned application Ser. No. 362,483, Apr. 24, 1964, which is a continuation-in-part of abandoned application Ser. No. 241,023, Nov. 29, 1962. This application Jan. 16, 1968, Ser. No. 698,356
Int. Cl. A01n 9/00
U.S. Cl. 424—296                                   4 Claims

ABSTRACT OF THE DISCLOSURE

A method is provided for inhibiting the growth of bacteria and fungi by applying thereto organoantimony compounds.

---

This application is a continuation of U.S. patent application Ser. No. 362,483, filed Apr. 24, 1964, now abandoned, which in turn was a continuation-in-part of U.S. patent application Ser. No. 241,023, filed Nov. 29, 1962, now abandoned.

This invention relates to methods of preventing and inhibiting the growth of microorganisms such as bacteria and fungi and to compositions of matter utilized in these methods. The invention also relates to materials which have been made resistant to attack by microorganisms such as bacteria and fungi by the aforesaid methods.

It is an object of this invention to provide methods for inhibiting and preventing the growth of microorganisms. It is still another object of the invention to provide bacteria-resistant compositions including paints, plastics, and fibrous products such as textiles and paper products. It is also an object of this invention to provide sanitizer compositions having particular utility in hospital treatment. Other objects will be apparent to those skilled in the art on inspection of the following description.

In accordance with certain of its aspects, the method of this invention for protecting a medium susceptible to attack by microorganisms comprises applying to the locus to be protected an effective amount of $R_nSbX_{3-n}$ wherein R is selected from the group consisting of alkyl, alkenyl, alkynyl, aryl, cycloalkyl, and cycloalkenyl, X is selected from the group consisting of halide, carboxylate, alkoxide, oxide, hydroxide, sulfide, mercaptide, and $n$ is an integer less than 4.

In the compounds $R_nSbX_{3-n}$ which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc., as well as substituted alkyls including phenylethyl, benzyl, etc. Typical alkenyl groups which may be employed may include vinyl, 2-propenyl (i.e., allyl), 1-propenyl, 1-butenyl, 2-butenyl, etc., as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyl-1-yl, propyn-2-yl, butyn-1-yl, phenylethynyl, ethynyl, etc. Typical aryl groups which may be employed may include phenyl, tolyl, xylyl, chlorophenyl, dimethylaminophenyl, etc. Where several R groups may be present, they may be the same or different.

In the compound $R_nSbX_{3-n}$, $n$ may be an integer less than 4, i.e., $n$ may be 1, 2, or 3. When $n$ is 1, the compound may be $RSbX_2$; when $n$ is 2, the compound may be $R_2SbX$; when $n$ is 3, the compound may be $R_3Sb$. It will be apparent to those skilled in the art that when X is a divalent group as hereinafter set forth, the compound may be $R_2Sb$—X—$SbR_2$, or alternatively RSbX.

The X group in the compound $R_nSbX_{3-n}$ may be halide, sulfide, oxide, carboxylate, phenoxide, alkoxide, and mercaptide. Typical halides may be chloride, bromide, etc. Typical carboxylates may be acetate, laurate, benzoate, salicylate, butyrate, propionate, etc. Typical phenoxides may include phenoxide se, o-phenylphenoxide, 8-quinolyloxide, pentachlorophenoxide, p-methylphenoxide, etc. Typical alkoxides may include methoxide, ethoxide, n-propoxide, i-propoxide, n-butoxide, etc. Typical mercaptides include phenyl mercaptide, lauryl mercaptide, butyl mercaptide, etc. It will be apparent that when X is divalent, e.g., sulfide or oxide, the formula may become, e.g., $R_nSb$—O—Sb—$R_n$ in which case $n$ may be 2. If desired, the X groups or the R groups may be cyclized, e.g., cyclopentamethylene antimony chloride or phenyl-antimony maleate. Where several X groups are present, they may be the same or different.

Typical specific compounds which may be employed when $n$ is 1 may include methyl antimony dichloride, ethyl antimony dibromide, n-propyl antimony diacetate, n-propyl antimony dimethoxide, n-butyl antimony dichloride, n-butyl antimony dibromide, n-butyl antimony diacetate, n-butyl antimony dilaurate, n-butyl antimony dimethoxide, n-butyl antimony oxide, n-butyl antimony dilauryl-mercaptide, n-butyl antimony sulfide, i-butyl antimony dichloride, i-butyl antimony diacetate, cyclohexyl antimony dichloride, cyclopentyl antimony diacetate, n-octyl antimony dibromide, vinyl antimony diacetate, allyl antimony dibenzoate, cyclohexenyl antimony dilaurate, butyn-1-yl antimony dichloride, phenylethynyl antimony diacetate, phenyl antimony dichloride, tolyl antimony dibroimde, p-chlorophenyl antimony sulfide.

Typical specific compounds which may be employed when $n$ is 2 may include dimethyl antimony chloride, diethyl antimony acetate, di-n-propyl antimony laurate, di-i-propyl antimony methoxide, di-n-butyl antimony bromide, di-n-butyl antimony methoxide, bis(di-n-butyl antimony) oxide, dicyclohexyl antimony chloride, diallyl antimony bromide, dibutyn-1-yl antimony acetate, diphenyl antimony chloride.

Typical specific compounds which may be employed when $n$ is 3 may include trimethyl antimony, triethyl antimony, tripropyl antimony, tri-n-butyl antimony, tri-i-butyl antimony, tri-n-amyl antimony, tri-n-octyl antimony, tri-p-chlorophenyl antimony, tri-p-tolyl antimony, triphenyl antimony, tricyclohexyl antimony, triallyl antimony, tri(phenylethynyl) antimony.

The most highly preferred compounds may be $RSbX_2$, typically phenyl antimony dichloride, phenyl antimony diacetate, and n-butyl antimony dichloride. The preferred compounds which may be employed in practice of this invention, may also include tri-n-butyl antimony. triphenyl antimony, trivinyl antimony, tri-n-propyl antimony, di-n-butyl antimony chloride, diphenyl antimony chloride, diphenyl antimony acetate, etc.

These compounds may be generally available or may be readily made in the laboratory. For example, compounds $R_3Sb$, typically triphenyl antimony, may be made by the reaction of the Grignard reagent RMgHal with $SbHal_3$, wherein Hal is halide, usually chloride. Reaction of $R_3Sb$ with $SbHal_3$ produces $R_2SbHal$ and $RSbHal_2$ which may be separated. $R_2SbHal$ or $RSbHal_2$ may be reacted with, e.g., sodium sulfide to produce $$R_2Sb\text{—}S\text{—}SbR_2$$

or RSbS; with ammonium hydroxide to produce $R_2SbOH$ or RSbO; with sodium ethoxide to produce $R_2Sb$(ethoxide) or $RSb$(ethoxide)$_2$; with sodium mercaptide, e.g., sodium lauryl mercaptide to produce $R_2Sb$ lauryl mercaptide or $RSb$(lauryl mercaptide)$_2$. $R_2SbHal$ may be reacted with ammonium carboxylate, e.g., ammonium acetate or ammonium butyrate, to produce $R_2Sb$(carboxylate). RSbO may be reacted with carboxylic acid, e.g., acetic acid, to produce $RSb$(carboxylate)$_2$, e.g., $RSb$(acetate)$_2$.

It is a particular feature of this invention that antimony compounds $R_nSbX_{3-n}$ may be used to control a wide range of microorganisms including bacteria and fungi. The compounds of this invention are highly effective against a wide spectrum of bacteria including gram negative and gram positive bacteria. Typical gram positive bacteria against which the technique of the invention may be particularly effective may include Staph. aureus. Typical gram negative bacteria which may be controlled in accordance with certain aspects of this invention may include A. aerogenes and P. aeruginosa. It is a particular feature of this invention that in accordance with certain aspects it may be used to control C. albicans, A. flavus, and P. funiculosum.

In practice of this invention, these microorganisms and preferably bacteria may be controlled in a wide variety of loci. It is possible according to this invention to treat plastics, textiles, paper products, paints and other specific materials which may serve as media in which microorganisms may grow. Plastics, textiles, paper products and paints are illustrative of the materials which are rendered resistant to attack when treated by applying the antimony compound to the surface and/or by incorporation therein. The plastics in massive and in fiber form may include urethanes, halogenated polymers and copolymers such as polyvinyl chloride and polyvinyl chloride-acetate copolymers, polyesters, polyamides, polyolefins, and natural rubbers, synthetic rubbers, etc. Natural fiber products that may be protected include paper products, hemp, and felts. Paints may be protected "in the can" and also after application. Typical paints may include interior and exterior vinyl latex and alkyd paints, nonsynthetic flat natural paints, the acrylics, and the vinyl, and antifouling paints such as the acrylic and the vinyl varieties thereof. The antimony compounds are also useful in preserving adhesives; in secondary oil recovery processes; in paper mill slime control processes; and in methods of controlling Staph. aureus in hospitals. They may be a useful and active component of detergent sanitizers and may be used for this and other purposes in the form of an aerosol material. They may also be used to protect plants and other growth against microorganism (including fungi) attack. The use of the novel bactericides of this invention to render plastics, especially polyvinyl chloride, resistant to attack by microorganisms and the novel resistant compositions produced thereby represent preferred embodiments of this invention.

Practice of this invention may be illustrated by reference to the following wherein various compounds were tested against a wide range of microorganisms. In Table I there is disclosed the results of the standard Broth Dilution Test wherein various compounds as noted were tested against bacteria.

In the tables showing Broth Dilution Test results, the tests are reported showing the activity of the compounds against noted microorganisms. In each example, a series of tests were carried out when the compound was placed within a nutrient broth in amount of 500, 250, 125, 63, 31, 16, 8, 4, and 2 parts per million (p.p.m.). Each broth was inoculated with the test organism and the broth incubated at 37° C. for two days. The organism growth was visually observed. The broth containing the minimum concentration which caused complete inhibition of the growth of the organism is listed.

TABLE I

| Compound | S. aureus | A. aerogenes | P. aeruginosa |
|---|---|---|---|
| Diphenyl antimony chloride | 4 | 4 | 8 |
| Phenyl antimony dichloride | 2— | 2— | 4 |
| Trivinyl antimony | 63 | 125 | 63 |
| Tripropyl antimony | 16 | 31 | 125 |
| Tributyl antimony | 5 | 31 | 63 |

From Table I, it will be apparent that the noted compounds may be employed in unexpectedly low levels to kill both gram negative and gram positive bacteria. As will be apparent to those skilled in the art, these compounds are unexpectedly highly effective.

In Table II, there are listed the results of a standard Broth Dilution Test against certain fungi.

TSBLE II

| Compound | C. albicans | A. flavus | P. funiculosum |
|---|---|---|---|
| Diphenyl antimony chloride | 63 | 63 | 500 |
| Phenyl antimony dichloride | 63 | 250 | 250 |
| Tributyl antimony | 63 | 250 | 125 |

From Table II, is will be apparent to those skilled in the art that the compounds of this invention unexpectedly exhibit a high order of activity against fungi.

The activity of the noted compounds in practice of this invention may also be demonstrated by the standard Agar Diffusion Test (Filter Peter Disc Method) as set forth in Table II. In this standard test, compounds were diluted in acetone to obtain the following stock solutions: 5, 2.5, 1.25, 0.63, 0.31%. Filter paper discs, 10 mm. in diameter, were dipped in the test solution and the solvent then allowed to evaporate. AATCC Bacteriostasis agar, held at 45° C., was inoculated to 1% with an 18–24 hour nutrient broth culture of S. aureus. The seeded agar was distributed at the rate of 15 ml./10 cm. petri dish and allowed to solidify. The treated filter paper discs were placed on the seeded agar. Then the plates were incubated at 37° C. for 48 hours. Inhibition was determined by a zone or halo adjacent to the treated disc.

TABLE III

| Compound | Percent concentrate | S. aureus, mm. |
|---|---|---|
| Triphenyl antimony | 5 | 1 |
| Triphenyl antimony | 2.5 | 1 |

It will be apparent from inspection of Table III that the compounds of this invention, typified by triphenyl antimony, unexpectedly perform as bacteriostats as judged by this test.

Table IV infra shows the results of certain compounds in the Bulk Agar Diffusion Test.

TABLE IV

| Compound | S. aurcus | E. coli | A. flavus | B. mycoides |
|---|---|---|---|---|
| Diphenyl antimony chloride, mm | 16 | 16 | | |
| Phenyl antimony dichloride, mm | 23 | 22 | | |
| Triphenyl antimony, mm | | | 4 | 3 |

It will be apparent from Table IV that the noted compounds may be unexpectedly active against bacteria and fungi. (The blank spaces in the table represent tests which were not performed in this series.)

In another series of comparative standard Agar Diffusion tests, selected compounds were blended in to polyvinyl chloride formulations containing 100 parts by weight of Geon 101 EP brand of polyvinyl chloride, 50 parts of dioctyl phthalate, 0.25 part of stearic acid, and 2 parts of a standard stabilizer for polyvinyl chloride against deterioration by heat and light. Typical formulations and results of tests are shown in Table V.

TABLE V

| Compound | Conc * | S. aureus, mm. | E. coli, mm. |
|---|---|---|---|
| Diphenyl antimony chloride | 0.5 | 4 | 0.5 |
| Diphenyl antimony chloride | 1.0 | 4 | 1 |
| Phenyl antimony dichloride | 1.0 | 7 | 2.5 |

* Parts of compound per 100 parts of resin.

It will be apparent to those skilled in the art that the noted compositions are unexpectedly superior in their activity against the noted organisms.

It is a particular feature of this invention that the preferred formulations prepared in accordance therewith possess an unexpectedly high activity against gram negative bacteria. It will be obvious to those skilled in the art that prior art bacteriocides possess little or no activity against gram negative bacteria when used in concentrations at which the preferred formulations of this invention (e.g., those containing phenyl antimony dichloride) may control a wide range of biocidal targets including gram negative bacteria. For example, in a comparison by means of a Broth Dilution Test against phenyl mercury acetate (a typical prior art bacteriocide), it was found that phenyl antimony dichloride was twice as active as phenyl mercury acetate against A. aerogenes and P. aeruginosa.

TABLE VI

| Compound | A. aerogenes | P. aeruginosa |
|---|---|---|
| Phenyl antimony dichloride | <2 | 4 |
| Phenyl mercury acetate | 4 | 8 |

The method of this invention may be effected by using the noted compound $R_nSbX_{3-n}$ in solid, liquid, or gaseous (including spray) formulations. It may for example be carried out by applying the compound to the surface of the material to be protected and/or admixing the compound with the material to be protected during the fabrication of said material. The compounds may be used per se, particularly when they are incorporated into the material during preparation or fabrication. Many materials, particularly fibrous products such as textiles, may be treated by applying the compound to the surface by dipping, padding, spraying, etc. They may be used in the form of a bactericidal composition in which the compound is the active component or one of the active components. Liquid compositions may be utilized in which the compound is dissolved and/or suspended in a solvent. Solid compositions may be utilized in which the compound is mixed with a carrier or diluent. The carrier may be inert, such as talcs, clays, diatomaceous earth, flours, etc., or it may have activity such as that shown by the quaternary ammonium compounds. The liquid formulations of of the emulsion type will often include a dispersion agent such as the anionic, cationic, or nonionic surface active agents. To obtain fungicidal and/or bactericidal compositions having an extremely broad spectrum of activity, the compound may be formulated with other active materials such as the triorganotins, pentachlorophenol, copper-8-quinolinolate, bisphenols, o-phenylphenol, and polybrominated salicylanilides.

It will be apparent to those skilled in the art that the contained amount of the active compound $R_nSbX_{3-n}$ present in the total composition may be sufficient to provide an effective amount at the locus to be protected against the appropriate microorganism. Typically such contained amounts may range from very low concentrations typically 0.001–0.002% up to 90–100%. These concentrations will permit attainment on the medium susceptible to attack at the locus to be protected, of effective amounts which may for example be, in water treatment, of 1–100 p.p.m. or in plastic treatment, 50–2000 p.p.m., etc.

Illustrative of the compositions containing the active antimony compound are those of Examples 1–4.

EXAMPLE 1

Spray composition

| | Parts by weight |
|---|---|
| Phenyl antimony dichloride | 0.02 |
| Toluene | 15 |
| Fluorohydrocarbon gaseous propellant | 84.98 |

EXAMPLE 2

Liquid composition

| Phenyl antimony dichloride | 1 |
|---|---|
| Acetone | 20 |
| Toluene | 79 |

EXAMPLE 3

Emulsion composition

| Diphenyl antimony acetate | 0.02 |
|---|---|
| Toluene | 15 |
| Nonionic surfactants (Triton X–100 brand) of isooctyl phenoxy polyethoxy ethanol | 20 |
| Water | 64.98 |

EXAMPLE 4

Solid composition

| Diatomaceous earth | 80 |
|---|---|
| Triphenyl antimony | 20 |

Specific formulations which may be used in practice of this invention may include those set forth in Examples 5–7.

EXAMPLE 5

Acrylic antifouling paint

| | Parts by weight |
|---|---|
| Titanium dioxide | 160 |
| Aluminum silicate | 48 |
| Talc | 12 |
| Methyl methacrylate-butyl methacrylate copolymer (40% in thinner) | 433 |
| Mineral spirits | 148 |
| Dibutyl antimony acetate | 50 |

EXAMPLE 6

Vinyl antifouling paint

| Titanium dioxide | 150 |
|---|---|
| Bentonite | 14 |
| Tricresyl phosphite | 10 |
| Vinyl chloride-vinyl acetate copolymer resin | 102 |
| Toluene | 223 |
| Methyl isobutyl ketone | 295 |
| Phenyl antimony dichloride | 35 |
| Butyl antimony dichloride | 35 |

EXAMPLE 7

Flat interior paint

| Titanium-calcium pigment | 625 |
|---|---|
| Calcium carbonate | 100 |
| Magnesium silicate | 25 |
| Ester gum solution (60% nonvolatile in mineral spirits) | 30 |
| Bodied linseed oil | 200 |
| Mineral spirits | 167 |
| Cobalt naphthenate (6% Co) | 1 |
| Lead naphthenate (24% Pb) | 2 |
| Phenyl antimony dilaurylmercaptide | 6 |

It is a particular feature of certain compositions prepared in accordance with this invention that they retain their unexpectedly high level of bacteriocidal activity under adverse conditions. These compositions are particularly characterized by their high activity in the presence of a wide variety of surface active agents, e.g., soaps, dispersants, detergents, etc. It is particularly unexpected that this activity may be retained in the presence of anionic soaps such as sodium stearate, e.g., Ivory soap. In an illustrative comparative test, a typical compound (phenyl antimony dichloride) was tested, alone and in combination with a nonionic detergent and with an anionic detergent such as sodium stearate (Ivory soap), by the standard Broth Dilution Test against *S. aureus* and *E. coli*. The results may be observed from Table VII.

TABLE VII

|  | S. aureus | E. coli |
| --- | --- | --- |
| Ivory soap | 10 | 10 |
| Nonionic soap (Triton X-100 brand of isooctyl phenoxy polyethoxy ethanol) | 10 | 10 |
| Control | 10 | 10 |

From this table it will be apparent that the presence of an anionic soap (i.e., Ivory soap) or a nonionic soap does not interfere with the unexpectedly superior performance of the compounds of this invention.

In order to demonstrate the effectivity of the process of this invention to control bacteria including fungi in paper pulp, a simulated standard paper pulp was formulated containing 8.4 parts of Whatman's No. 2 Grade filter paper, 2.6 parts of sodium nitrate, 1 part of pearl filler calcium sulfate, 6.5 parts of maltose, 1 part of nutrient broth BBL made by Baltimore Biological Laboratories, 10 parts of 2% Mersize RM7OR brand of sizing material, 2.5 parts of 2% solution of alum, and 990 parts of water. To this mixture there was added various concentrations (Table VIII) of phenyl antimony dichloride and (Table IX) diphenyl antimony chloride. In the several experiments, the concentrations of these materials were maintained at 0 p.p.m. (control) 5, 10, 50, 100 and 500 p.p.m. The control sample was tested at 0 time to determine its content of *A. aerogenes* and *P. aeruginosa*. The simulated paper pulp was tested after 24 hours to determine the content of these bacteria. The results are shown tabulated in Table VIII and Table IX.

TABLE VIII.—PHENYL ANTIMONY DICHLORIDE

| Concentration p.p.m. | A. aerogenes | P. aeruginosa |
| --- | --- | --- |
| 0 (control at 0 hours) | $12 \times 10^5$ | $50 \times 10^5$ |
| 0 at 24 hours | $18 \times 10^5$ | $20 \times 10^7$ |
| 5 at 24 hours | $32 \times 10^4$ | $49 \times 10^3$ |
| 10 at 24 hours | $16 \times 10^4$ | $23 \times 10^2$ |
| 50 at 24 hours | 0 | $72 \times 10^2$ |
| 100 at 24 hours | 0 | 0 |
| 500 at 24 hours | 0 | 0 |

TABLE IX.—DIPHENYL ANTIMONY CHLORIDE

| Concentration p.p.m. | A. aerogenes | P. aeruginosa |
| --- | --- | --- |
| 0 (control) at 0 hours | $12 \times 10^5$ | $50 \times 10$ |
| 0 at 24 hours | $18 \times 10^5$ | $20 \times 10^7$ |
| 5 at 24 hours | $55 \times 10^3$ | $>10 \times 10^6$ |
| 10 at 24 hours | $30 \times 10^2$ | $10 \times 10^5$ |
| 50 at 24 hours | $10 \times 10^1$ | $11 \times 10^4$ |
| 100 at 24 hours | 0 | $22 \times 10^3$ |
| 500 at 24 hours | 0 | 0 |

From inspection of the above tables, it will be apparent that use of the noted compounds, used in practice of this invention, permits attainment of paper pulp characterized by its freedom from bacterial growth which commonly produces slime. It will be apparent for example from Table VIII that phenyl antimony dichloride in concentration of as low as 5 p.p.m. may permit substantial reduction of the bacterial content and use of only 100 p.p.m. will completely kill both *A. aerogenes* and *P. aeruginosa*.

The potent biocides having the formula $R_nSbX_{3-n}$ wherein $n$ is 2; R is selected from the group consisting of alkyl, alkenyl, alknyl, aryl, cycoalkyl, and cycoalkenyl; and X is mercaptide are new compounds which possess valuable properties. For example, compounds of this type are especially effective biocides for use in plastics, typcially poly(vinyl chloride).

These compounds may have the formula $R_nSbX_{3-n}$ wherein $n$ is 2 and X is mercaptide. Preferably, they may have the formula $R_2SbSR'$ wherein R is as defined supra and R' is selected from the same group as is R, i.e., R and R' are independently selected from the group consisting of alkyl, alkenyl, alkynyl, aryl, cycloalkyl, and cycloalkenyl.

When R' is alkyl, it may include methyl, ethyl, n-propyl, i-propyl, n-butyl, i-butyl, n-amyl, n-octyl, 2-ethylhexyl, etc., as well as inertly substituted alkyls including phenylethyl, benzyl, carboethoxymethyl, etc.

Typical alkenyl groups which may be employed may include 2-propenyl (i.e., allyl), 3-butenyl, etc., as well as inertly substituted alkenyl groups typified by 4-phenyl-3-butenyl, 2-methyl-2-propenyl, etc. Typical cycloalkyl groups may include cyclohexyl, cycloheptyl, cyclooctyl as well as inertly substituted cycloalkyl groups including 2-methylcycloheptyl, 3-butylcyclohexyl, 3-methylcyclohexyl, etc. Typical aryl groups which may be employed may include phenyl, tolyl, xylyl, chlorophenyl, dimethylaminophenyl, etc.

The novel biocides having the formula $R_nSbX_{3-n}$ wherein $n$ is 2 and X is mercaptide may be prepared by the reaction of $R_2SbCl$, wherein R is as defined supra, with an alkali metal mercaptide, e.g., sodium lauryl mercaptide; by the reaction of $(R_2Sb)_2O$ with a mercaptan, e.g., phenyl mercaptan, butyl mercaptan, etc. For example, diphenyl antimony chloride may be reacted with an alkali metal mercaptide such as sodium lauryl mercaptide, sodium phenyl mercaptide, sodium butyl mercaptide, sodium ethyl mercaptide, sodium n-propyl mercaptide, sodium isopropyl mercaptide, sodium n-butyl mercaptide, sodium isobutyl mercaptide, sodium sec-butyl mercaptide, etc.

$$(C_6H_5)_2SbCl + NaSC_4H_9 \rightarrow (C_6H_5)_2SbSC_4H_9 + NaCl$$

Preferably, the reaction may be carried out by mixing together the $R_2SbCl$ and the sodium mercaptide in equimolar quantities in the presence of an inert hydrocarbon diluent, say benzene, and heating the so-formed reaction mixture to reflux for a period of time sufficient to complete the reaction, typically 0.5–20 hours, say 4–6 hours. By-product sodium chloride may be filtered off and the solvent, typically benzene, may be stripped from the product.

The novel compounds may also be prepared by the reaction of $(R_2Sb)_2O$ with a mercaptan. For example, bis(diphenyl antimony) oxide may be reacted with ethyl mercaptan, n-propyl mercaptan, sec-butyl mercaptan, phenyl mercaptan, benzyl mercaptan, cyclohexyl mercaptan, lauryl mercaptan, p-tolyl mercaptan, allyl mercaptan, etc. Reaction of $(R_2Sb)_2O$ with a mercaptan may preferably be effected by mixing together 1 mole of the former with 2 moles of the latter in the presence of an inert hydrocarbon diluent, typically benzene, and refluxing the so-formed reaction mixture for about 0.3–10, say 1–2 hours with a Dean-Stark trap to remove by-product water. When no further reaction is observed, the remaining solvent may be stripped off to leave the product.

Illustrative examples of the novel products of this invention having the formula $R_nSbX_{3-n}$ wherein $n$ is 2; R is selected from the group consisting of alkyl, alkenyl, alkynyl, aryl, cycloalkyl, and cycloalkenyl; and X is mercaptide may include:

di-n-butyl antimony lauryl mercaptide
diphenyl antimony lauryl mercaptide
ditolyl antimony n-amyl mercaptide
dibenzyl antimony benzyl mercaptide
diallyl antimony cyclohexyl mercaptide
diphenyl antimony allylmercaptide
dicyclohexyl antimony n-hexyl mercaptide
ditolyl antimony phenyl mercaptide
di-isopropyl antimony 2-ethylhexyl mercaptide
di-p-chlorophenyl antimony n-butyl mercaptide
diphenyl antimony ethyl mercaptoacetate.

EXAMPLE 8

Diphenylantimony n-amyl mercaptide $\phi SbSC_5H_{11}$

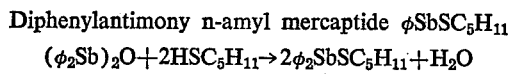

A solution of 56.8 grams (0.1 mole) of bis(diphenylstibine) oxide and 20.8 grams (0.2 mole) of pentanethiol in 400 ml. of benzene was heated under reflux in a flask equipped with Dean-Stark trap and reflux condenser. Within 1.5 hours, 1.8 ml. of water (100% yield) had collected in the trap. The solvent was removed at 65° C./80 mm., leaving a hazy liquid which was clarified by filtration (71.0 grams; 93.7%).

The product distilled at 218° C./0.5 mm. without apparent decomposition.

*Analysis.*—Calcd. for $C_{17}H_{21}SSb$ (percent): Sb, 32.11; S, 8.46. Found (percent): Sb, 31.6; S, 7.9.

EXAMPLE 9

Diphenylantimony carboethoxymethyl mercaptide
$\phi_2SbSCH_2COOC_2H_5$

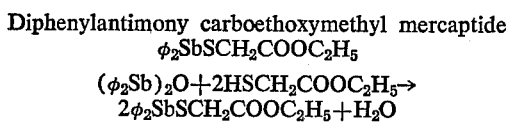

A solution of 56.8 grams (0.1 mole) of bis(diphenylstibine) oxide and 24 grams (0.2 mole) of ethyl mercaptoacetate in 400 ml. of benzene were heated under reflux in a flask equipped with Dean-Stark trap and reflux condenser. Over a period of 1 hour, 1.8 ml. (100%) of water collected in the trap. The solvent was removed by distillation at 65° C./80 mm., leaving a yellow hazy oil which was clarified by filtration (78.0 grams; 98%). This distilled at 210–222° C./0.55 mm., with slight decomposition.

Calcd. for $C_{16}H_{17}SO_2Sb$ (percent): Sb, 30.82; S, 8.11. Found (percent): Sb, 28.6; S, 6.8.

EXAMPLE 10

Di-n-butyl antimony lauryl mercaptide
$(C_4H_9)_2SbSC_{12}H_{25}$

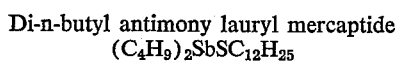

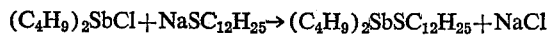

27.2 grams (0.1 mole) of di-n-butyl antimony chloride may be dissolved in 500 ml. of dry benzene and 22.5 grams (0.1 mole) of sodium lauryl mercaptide added thereto. The mixture may be heated to reflux and refluxed with stirring for 5 hours, thereby forming di-n-butyl antimony lauryl mercaptide and sodium chloride. The mixture may be filtered hot to remove sodium chloride, and the filtrate stripped under vacuum to give product. If desired, the di-n-butyl antimony lauryl mercaptide may be further purified by fractional distillation at about 0.5 mm. pressure.

The novel compounds of the formula $R_nSbX_{3-n}$ wherein R is selected from the group consisting of alkyl, alkenyl, alkynyl, aryl, cycloalkyl, and cycloalkenyl; n is an integer less than 3, i.e., 1 and 2; and X is alkoxide are also new compounds which have not heretofore been known and which are characterized by their surprisingly high activity against pestiferous organisms.

These novel compounds may have the formula $$R_nSbX_{3-n}$$

wherein R is a described supra; n is an integer less than 3, i.e., 1 and 2; and X is alkoxide. More specifically, the novel compounds may have the formula $R_nSb(OR'')_{3-n}$ wherein R is as described supra; n is an integer less than 3; and R'' is alkyl, including inertly substituted alkyl and cycloalkyl.

R'' may be alkyl, including methyl, ethyl, n-propyl, isopropyl, n-butyl, isobutyl, sec-butyl, tert-butyl, amyl, hexyl, heptyl, octyl, decyl, dodecyl, tetradecyl, octadecyl, cyclohexyl, 2-ethylhexyl, benzyl, phenylethyl, 4-phenylbutyl, ethoxyethyl, etc. Preferably, R'' may be lower alkyl, i.e., an alkyl containing less than about 10 carbon atoms, and most preferably R'' may be butyl.

These novel compounds may typically be prepared by the reaction of organoantimony halide, say $R_nSbCl_{3-n}$, with an alkali metal alkoxide or by reaction of organoantimony halide, say $R_nSbCl_{3-n}$, with alcohol, say R''OH, in the presence of a proton acceptor, preferably ammonia. A typical reaction may be represented as

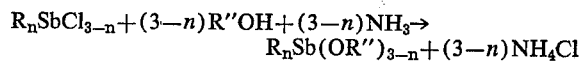

Where R is the preferred phenyl radical and n is 2, the reaction may be

Examples of alcohols R''OH which may be employed in the preferred method of preparation include:

| | |
|---|---|
| Methanol | decyl alcohol |
| ethyl alcohol | dodecyl alcohol |
| n-propyl alcohol | tetradecanol |
| isopropyl alcohol | cetyl alcohol |
| n-butyl alcohol | octadecanol |
| isobutyl alcohol | 2-ethylhexanol |
| sec-butyl alcohol | benzyl alcohol |
| tert-butyl alcohol | phenylethyl alcohol |
| amyl alcohol | 4-phenylbutanol |
| hexyl alcohol | ethoxyethanol |
| octyl alcohol | |

Other equivalent compounds may also be employed.

Preferably, reaction of $R_nSbCl_{3-n}$ and R''OH may be carried out in the presence of inert organic solvent such as benzene, toluene, hexane, heptane, etc. Stoichiometric quantities of the two reactants may be used or an excess, of one reactant typically R''OH, may be employed. The two reactants may be mixed together in the presence of the base, typically ammonia, or the base and $R_nSbCl_{3-n}$ may be mixed together prior to the addition of R''OH. When this procedure is followed, a complex between the base and $R_nSbCl_{3-n}$ may be formed.

When all of the reactants are present, the reaction mixture may be heated, typically to about 40–120° C., preferably 75–100° C. for about 1–10 hours during which time the desired product may be formed, together with by-product, typically ammonium chloride. The product may be isolated by filtering off by-product and distilling off any residual R''OH and inert organic solvent.

Illustrative novel compounds of this invention having the formula $R_nSbX_{3-n}$ wherein R is selected from the group consisting of alkyl, alkenyl, alkynyl, aryl, cycloalkyl, and cycloalkenyl; n is an integer less than 3; and X is alkoxide, include;

diphenyl antimony butoxide
diphenyl antimony ethoxide
diphenyl antimony n-propoxide
diphenyl antimony phenylethoxide
diphenyl antimony benzyloxide
phenyl antimony dibutoxide
phenyl antimony diethoxide
phenyl antimony di-2-ethylhexoxide
phenyl antimony diphenylethoxide
phenyl antimony dibenzyloxide
di-n-butyl antimony ethoxide
ditolyl antimony cyclohexoxide
dibenzyl antimony n-propoxide
diallyl antimony butoxide
dicyclohexyl antimony methoxide
di-isopropyl antimony ethoxide
di-p-chlorophenyl antimony butoxide
n-butyl antimony dimethoxide
tolyl antimony di-2-ethylhexoxide
benzyl antimony diethoxide
allyl antimony dibutoxide
cyclohexyl antimony dimethoxide isopropyl antimony butoxide
p-chlorophenyl antimony dihexoxide These novel compounds may be prepared by employing the desired alcohol and antimony halide in the process hereinbefore described. For example, 90 grams (0.29 mole) of diphenyl antimony chloride may be dissolved in 2 liters of anhydrous benzene and filtered clear into a 5-liter flask under a nitrogen atmosphere. Ammonia gas may be bubbled into the solution over a period of 4.5 hours, during which time a white diphenylantimony chloride-ammonia complex precipitates. Anhydrous n-butanol, 400 ml. (0.29 mole+50% excess) may be added over a period of 15 minutes, and the resultant opaque white reaction mass heated to reflux and refluxed with stirring for 7.5 hours. The reaction mass may then be cooled, and filtered to remove ammonium chloride. Solvent is stripped from the filtrate under vacuum to a pot temperature of 100° C./2.3 mm. Hg. The oil residue of 89.4 grams (88.5% yield) which crystallizes on standing may have a boiling point of 133–141° C. at 0.5 mm. Hg. It may give n-butanol on hydrolysis. Analysis shows 37.7% Sb (theory for diphenyl antimony butoxide is 34.9% Sb).

As a further illustration of the process for preparing these novel compounds, 187.0 grams (0.69 mole) of phenyl antimony dichloride may be dissolved in 2 liters of anhydrous benzene and filtered into a 5-liter, 3-neck flask under nitrogen. Ammonia gas may be bubbled into the solution over a period of 4 hours during which time a white ammonia complex precipitates. Anhydrous n-butanol 1920 ml. (1.39 moles plus 50% excess) may be added over a period of 0.5 hour, after which the reaction mass is heated to reflux and refluxed with stirring for 3 hours. The reaction mass may be cooled and filtered to remove ammonium chloride and solvent may be stripped from the filtrate to a pot temperature of 100° C. at 2 mm. Hg. The product may have a boiling point of 134–147° C. at 0.3 mm. Hg. Analysis shows 35.9% Sb (theory for phenyl antimony dibutoxide is 35.3% Sb).

Thus it will be seen that the novel compositions of this invention permit attainment of unexpected results and that these results may particularly be obtained by the use of the new compounds $R_nSb(AR)_{3-n}$ wherein A may be selected from the group consisting of oxygen, O, and sulfur, S; $n$ is an integer less than 3; and $n$ is 2 when A is sulfur.

Although this invention has been illustrated by reference to specific examples, numerous changes and modifications thereof which clearly fall within the scope of the invention will be apparent to those skilled in the art.

What is claimed is:

1. A method for inhibiting the growth of bacteria and fungi comprising applying to the microorganisms a bactericidally and fungicidally effective amount of a compound $R_nSbX_{3-n}$ wherein R is selected from the group consisting of alkyl, alkenyl, alkynyl, carbocyclic aryl, cycloalkyl, and cycloalkenyl, X is selected from the group consisting of carboxylate, alkoxide, oxide, hydroxide, sulfide and mercaptide, and $n$ is an integer less than 4.

2. The method claimed in claim 1 wherein said compound is $RSbX_2$.

3. The method claimed in claim 1 wherein R is phenyl.

4. The method claimed in claim 1 wherein the compound is phenyl antimony diacetate.

References Cited

UNITED STATES PATENTS

| | | | |
|---|---|---|---|
| 2,499,396 | 3/1950 | Lynn | 167—30 |
| 2,516,477 | 7/1950 | Moberly | 167—30 |
| 2,993,924 | 7/1961 | Marks et al. | 260—446 |
| 3,035,076 | 5/1962 | Gaillot et al. | 260—446 |
| 3,080,406 | 3/1963 | Marks et al. | 260—446 |
| 3,117,983 | 1/1964 | Mathews | 260—446 |
| 3,247,050 | 4/1966 | Leebrick | 167—22 |

FOREIGN PATENTS

| | | | |
|---|---|---|---|
| 303,092 | 12/1928 | Great Britain | 167—30 |

OTHER REFERENCES

Coates, Orango-Metallic Compounds, John Wiley & Sons Inc., New York, 1960, pp. 214–227.

ALBERT T. MEYERS, Primary Examiner

F. E. WADDELL, Assistant Examiner